United States Patent [19]
Glachet et al.

[11] 3,817,403

[45] June 18, 1974

[54] REMOTE MANIPULATOR

[75] Inventors: Charles Glachet, Vendome; Jean-Pierre Guilbaud, Jouars Pontchartrain; Jean Vertut, Issy-les-Moulineaux, all of France

[73] Assignee: Commissariat A L'Energie Atomique, Paris, France

[22] Filed: Apr. 25, 1973

[21] Appl. No.: 354,380

[30] Foreign Application Priority Data
May 10, 1972 France.......................... 72.16860

[52] U.S. Cl. ........................................... 214/1 CM
[51] Int. Cl. .............................................. B25j 3/00
[58] Field of Search ................................ 214/1 CM

[56] References Cited
UNITED STATES PATENTS
3,601,280  8/1971  Guennec........................ 214/1 CM
3,664,517  5/1972  Germond........................ 214/1 CM Primary Examiner—Robert J. Spar
Assistant Examiner—George F. Abraham
Attorney, Agent, or Firm—Cameron, Kerkam, Sutton, Stowell & Stowell

[57] ABSTRACT

The remote manipulator of the master-slave type comprises an arm pivoted about a shoulder axis, a fore-arm pivotally mounted on an elbow pin having an axis which is parallel to the shoulder axis and a tong unit pivotally mounted on a wrist pin provided at that end of the fore-arm which is remote from the elbow pin.

In order to carry out the movement of the arm about the shoulder axis, the movement of rotation of the arm about its own axis and the movement of the fore-arm about the elbow-pin axis, two motors are mounted as a differential drive system so as to ensure that the sum of their actions initiates one of the movements and the difference thereof initiates a second movement whilst a third motor initiates the third movement independently of the two other motors.

4 Claims, 9 Drawing Figures

REMOTE MANIPULATOR

This invention relates to remote manipulators of the general master-slave type in which the different control motions are performed by means of motors which are carried by the remote manipulator itself and connected through a bilateral correspondence-control system to a control or master assembly, said assembly being identical with the remote manipulator which constitutes the slave assembly but located at a distance from this latter, especially outside a dangerous zone. The correspondence-control loop is so arranged that any control action exerted on the master assembly is accurately reproduced by the slave assembly with a force of similar value and that, conversely, the reactions on the slave assembly are transmitted to the master assembly by returning the applied force to the operator who actuates this latter, for example when a stationary or moving obstacle is encountered, when an object is lifted and so forth.

The invention applies more particularly to remote manipulators in which the slave assembly (or master assembly) comprises an arm pivoted about a stationary and horizontal shoulder axis, said arm being also capable of pivoting about its own axis, a fore-arm pivotally mounted on an elbow pin at one end of the arm and a tong unit pivotally mounted on a wrist pin provided at that end of the fore-arm which is remote from the elbow pin, the control movements of closure of the tongs, of rotation of the tong unit about its own axis and of elevation of said tong unit about its wrist-pin axis as well as the movement of rotation of the fore-arm about its own axis being performed by means of four independent motors carried by a supporting block pivotally mounted on a pin which is parallel to the elbow pin at the opposite end of the arm, movements having the same amplitudes and the same directions as those of the fore-arm being imparted to said supporting block so as to ensure continuous balancing of the remote manipulator about the shoulder axis and the arm axis proper irrespective of the movements of the arm and of the fore-arm.

In order to carry out the other movements of the remote manipulator, namely the movement of the arm about its shoulder axis, the movement of rotation of said arm about its own axis and finally the movement of the fore-arm about its elbow-pin axis, the remote manipulator utilizes three further motors in a manner which is known per se. The invention relates to a particular arrangement of said three additional motors and of their transmission elements in order that the inertia of the complete assembly may thus be limited and made substantially equal in the three movements considered.

To this end, the remote manipulator in accordance with the invention essentially comprises for the control of the three movements aforesaid, two motors mounted as a differential drive system so as to ensure that the sum of their actions initiates one of the movements and the difference thereof initiates a second movement whilst a third motor initiates the third movement independently of the two other motors.

In accordance with one particular feature, the first movement which corresponds to the movement of the arm about the shoulder axis causes the fore-arm to carry out an equal relative movement of rotation through an opposite angle about the elbow-pin axis.

Further characteristic features of a remote manipulator in accordance with the invention will become apparent from the following description of one exemplified embodiment which is given hereinafter by way of indication without any limitation being implied, reference being made to the accompanying drawings, wherein:

FIG. 4a corresponds to the system of the invention and FIG. 4b corresponds to a conventional system in which provision is not made for a differential assembly;

Figure 1:
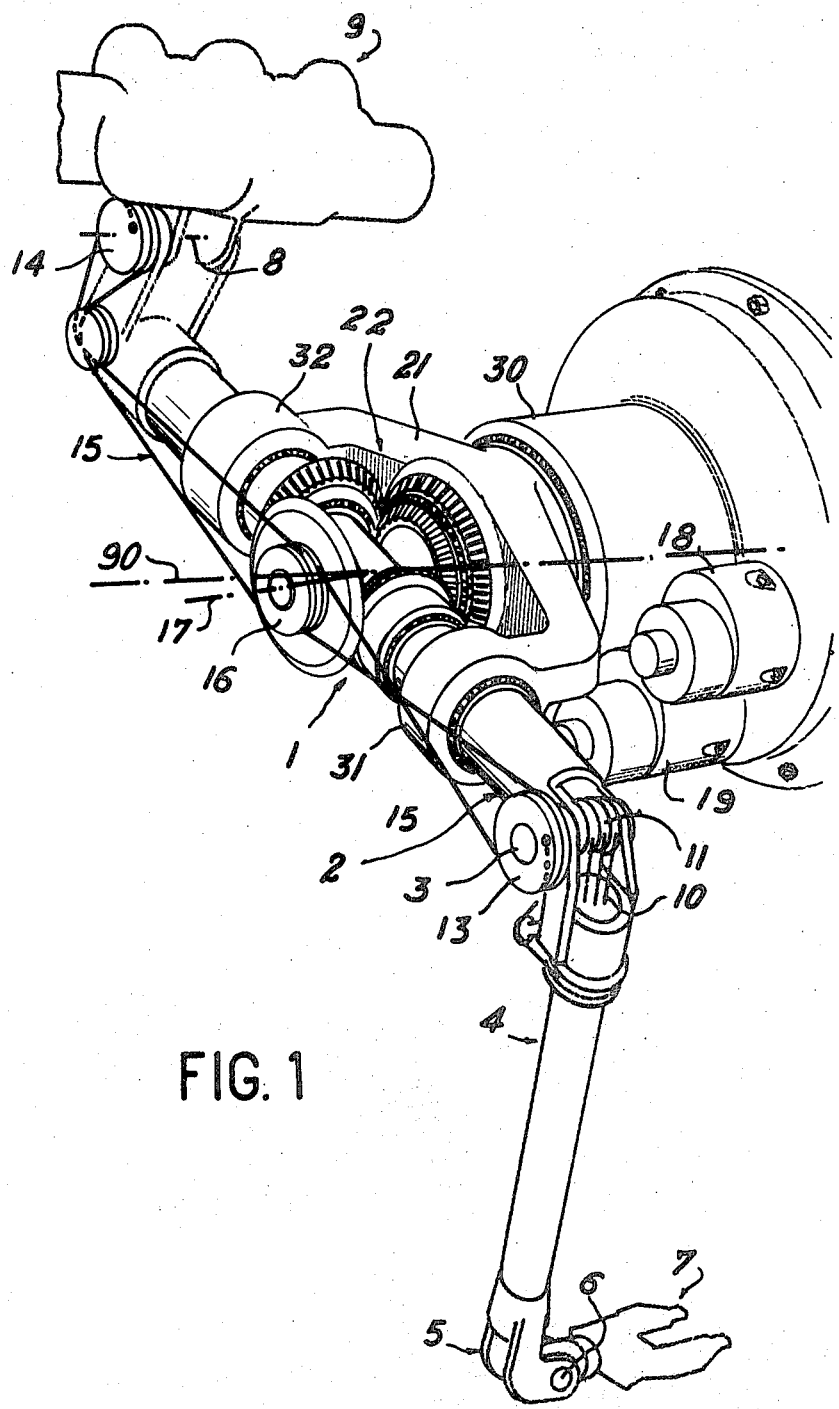
FIG. 1 is a partial view in perspective which shows the remote manipulator under consideration and more especially the elements for controlling the movements of the arm and fore-arm of said manipulator.

As shown in FIG. 1, the remote manipulator under consideration is generally designated by the reference numeral 1 and mainly composed of a tubular arm 2 provided at one end with a pin 3 on which is pivotally mounted a fore-arm 4. There is mounted at the opposite end of said fore-arm a yoke 5 which supports a transverse wrist-articulation pin 6 for a tong unit 7. A supporting member for a second pin 8 which is parallel to the elbow pin 3 is placed at that end of the arm 2 which is remote from the elbow pin 3. A block 9 which supports four drive motors (not shown in the drawings) is pivotally mounted on the arm 2 by means of said supporting member. By making use of transmission elements such as cables, belts or chains 10 guided over pulleys 11 mounted to rotate freely on the different pivot-pins provided on the arm, the motors aforesaid are intended to produce four predetermined movements corresponding on the one hand to the rotation of the fore-arm 4 about its own axis and on the other hand to movements of the tong unit 7 which consists in the clamping motion of said tong unit, the angular displacement of the unit about its wrist pin 6 and finally in the rotational motion of the tong unit about its own axis.

By virtue of these arrangements which are already known per se, the remote manipulator of the type described above is so arranged that the supporting block 9 continuously balances the assembly which is constituted by the fore-arm 4 and the tong unit 7, no matter what movements are carried out by said block. Moreover, the fore-arm 4 on the one hand and the supporting block 9 on the other hand are pivoted about their pins 3 and 8 and connected to pulleys 13 and 14 mounted on said pins which are in parallel relation. The lengths of a control cable 15 consisting of two parts are passed within the grooves of said pulleys, the two parts of the cable being passed over a common pulley 16 which is rotatably mounted about an axis 17. The pulleys 13, 14 and 16 have the same diameter, the controlled rotation of the pulley 16 being intended to initiate a movement of rotation of the fore-arm 4 which is associated with the pulley 13 and about the elbow pin 3 at the same time as an identical movement of rotation of the supporting block 9 in the same direction, said block being associated with the pulley 14. The other movements of the remote manipulator consists on the one hand in the control of pivotal motion of the arm 2 about the axis 17 and on the other hand in the rotational motion of the remote manipulator about the axis of the arm 2, with the result that the assembly consisting of the fore-arm and tong unit can be caused to pivot about the axis of the arm itself.

Figure 2:
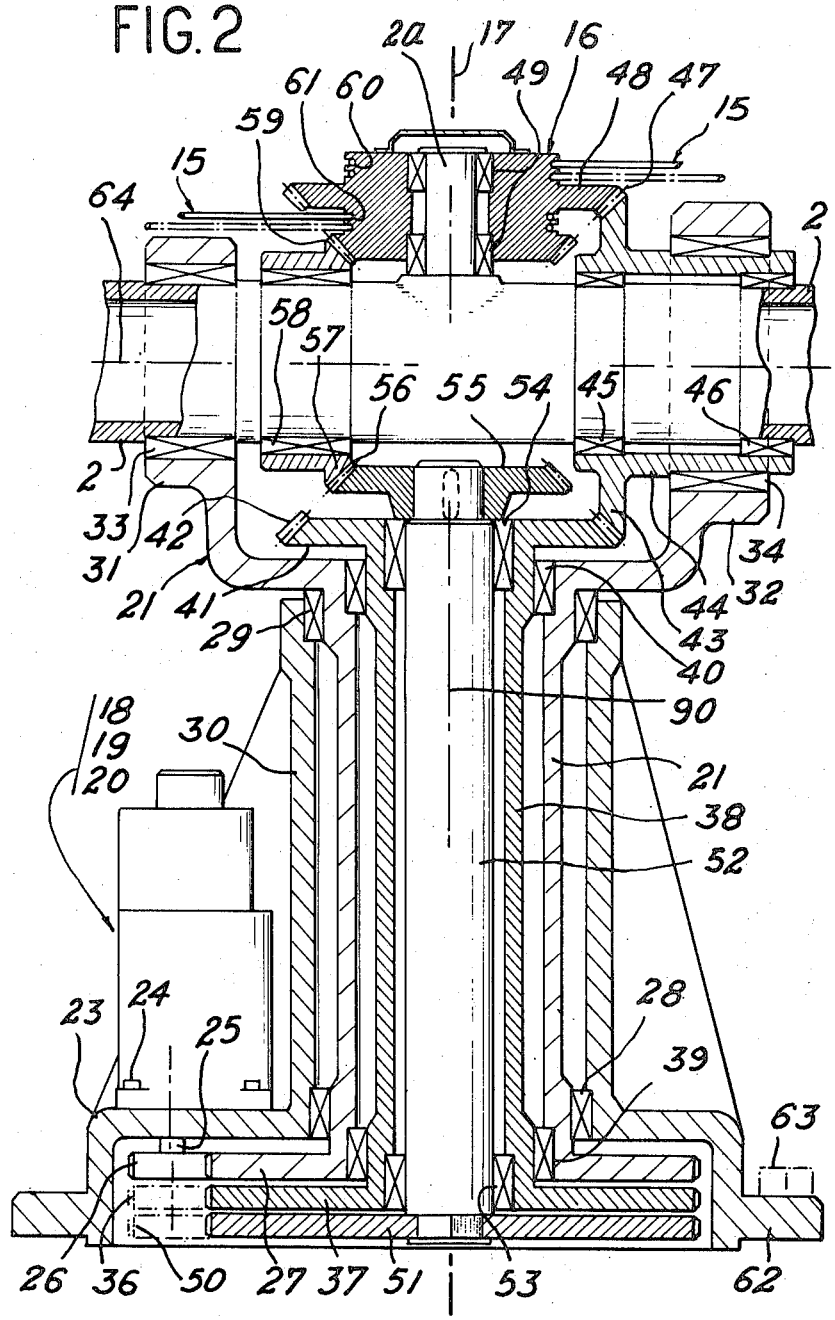
FIG. 2 is a diagrammatic top view to a larger scale and in cross-section showing the detail of the drive mechanisms which are incorporated in the remote manipulator.
Figure 3:
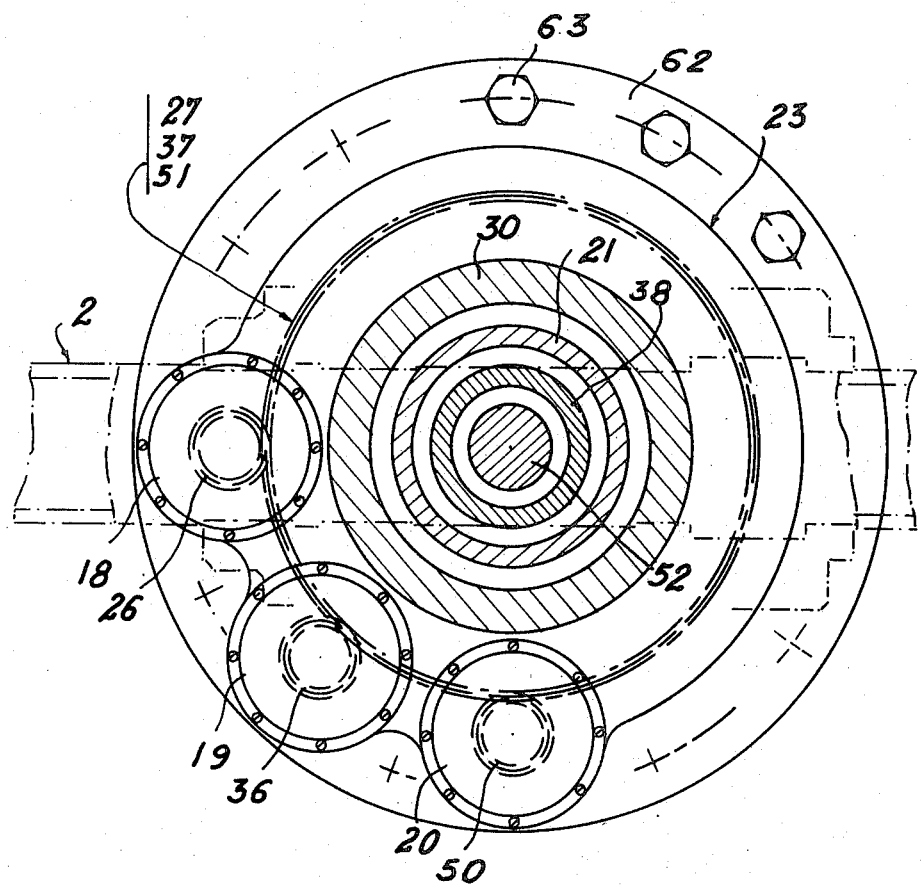
FIG. 3 is a view in elevation of that portion of the remote manipulator which is shown in FIG. 2.

In order to carry out the three movements mentioned above, the remote manipulator under consideration is provided in accordance with the invention with a support for three drive motors 18, 19 and 20 (as shown in FIG. 3). Two of these motors which are designated by the reference numerals 18 and 19 are shown only in the perspective view of FIG. 1. The arm 2 is mounted in two bearing housings 31 and 32 placed at the ends of a tubular supporting fork 21 which carries a differential drive system 22, the constructional detail of which is shown more clearly in FIG. 2. The fork 21 is capable of pivoting about a fired horizontal axis 90 or so-called shoulder axis.

In this figure, there is shown only one of the three drive motors, for example the motor 18 which is fixed on a casing 23 by means of locking screws 24. A driving pinion 26 is mounted on the output shaft 25 of the motor 18 and disposed in meshing engagement with a toothed ring 27 mounted at the extremity of the tubular fork 21 which supports the arm 2. The movement of rotation of said fork with respect to the casing 23 is carried out on ball bearings 28 and 29 mounted between the external surface of said tubular fork and a stationary cylindrical extension 30 of the casing 23. At the top portion thereof, the fork 21 has two lateral arms which can also be seen in FIG. 1 and terminate in the bearing housings 31 and 32 which support the arm 2 by means of bearings such as those designated by the references 33 and 34. By means of said bearings, the arm 2 is permitted to rotate about its own axis 64 within the bearing housings in the fork 21 and independently of the movement of the fork itself, thus carrying out the pivotal movement of the arm about the shoulder axis 90 under the action of the drive motor 18.

A second drive motor such as the motor 19 (omitted from FIG. 2 for the sake of enhanced simplicity of the drawing) drives a pinion 36 in the same manner as the motor 18; said pinion is disposed in meshing engagement with a second toothed ring 37 placed in parallel relation to the ring 27 within the casing 23 and terminating in a tubular element 38 which is disposed coaxially with the fork 21 and with the cylindrical extension 30. The element 38 is capable of rotating with respect to the fork 21 on bearings 39 and 40. Said cylindrical extension is provided with a top transverse ring 41 provided with a peripheral set of bevel-gear teeth 42; this latter in turn engages with similar teeth of a pinion 43 terminating in a cylindrical sleeve 44 which is mounted to rotate freely on the shaft 2 by means of bearings 45 and 46. Finally, said pinion 43 engages with a second bevel-gear 47 at the periphery of a ring 48 which forms part of the pulley 16 having an axis 17, said pulley being supported by bearings 49 on a transverse stub shaft 2a which is rigidly fixed to the arm 2.

The third drive motor 20 which is not shown in FIG. 2 but appears in FIG. 3 is intended to drive a pinion 50 in rotation; said pinion is in meshing engagement with a third ring 51 which is placed within the casing 23 beneath the rings 37 and 27 in parallel relation to these latter. Said ring 51 is rigidly fixed to a shaft 52, the axis of which coincides with the axis of the members 21, 30 and 38. Said shaft 52 is capable of rotating freely with respect to the tubular extension 38 of the intermediate ring 37 on bearings 53 and 54. At the top end, the shaft 52 carries a transverse ring 55 which is parallel to the ring 41 and provided with a peripheral set of bevel-gear teeth 56 so arranged as to be located on a cone which has the same vertex as the gear-teeth 42 of the ring 41. The common vertex of the gears 42 and 56 is accordingly located at the intersection of the axis 17, the axis 64 of the arm 2 and the shoulder axis 90. Said bevel-gear 56 causes the rotation of a ring 57 which is rotatably mounted on the shaft 2 by means of a bearing 58 and which in turn engages on the side opposite to the ring 55 with a second bevel-gear 59 forming part of the shoulder pulley 16 of the remote manipulator. As in the previous case, the gear 59 is located on a cone having the same vertex as the cone corresponding to the bevel-gear 47 of the first ring 48 of the same pulley 16. Finally, the pulley just mentioned is provided with two transverse grooves 60 and 61 respectively for the two parts of the transmission cable 15 which are connected to said pulley and control by means of this latter the movement of the pulleys 13 and 14 (FIG. 1) of the elbow pin 3 and pivot-pin 8 of the supporting block 9. The transmission mechanisms as thus described and illustrated in the view in elevation of FIG. 3 are rigidly fixed as a complete unit to the support of the remote manipulator by means of a transverse shoulder 62 of the casing 23 and locked in position by means of screws 63 (as shown in FIG. 2).

The remote manipulator operates in the following manner: as has already been mentioned, the pivotal movement of the arm 2 about the fixed shoulder axis 90 is controlled from the motor 18 by means of the pinion 26 which drives the toothed ring 27 so as to cause the rotation of the fork 21 and the rotation of the complete arm assembly by means of the supporting bearings 31 and 32.

The two other movements are carried out by means of the two other motors 19 and 20 which produce action in the same manner as a differential drive system. Accordingly, if these two motors are caused to rotate in the same direction and at the same speed, the toothed rings 37 and 51 are driven in rotation about the common axis of the tubular extension 38 and of the shaft 52. In consequence, the rings 41 and 55 carry out a movement of rotation in the same direction which is transformed into movements of rotation in opposite directions in the case of the rings 43 and 57 by reason of their opposite positions on the arm 2. These movements of rotation again take place in opposite directions in the case of the pulley 16 which is driven freely about the axis 17 on the stub shaft 2a in a movement which is opposite to the direction of rotation of the shaft 52. The rotation of the pulley 16 causes the cable 15 to be either taken up or paid out towards the pulleys 13 and 14 and therefore produces a movement of angular displacement of the fore-arm 4 about its elbow axis over a range of travel having the same amplitude and direction as the supporting block 9 which performs a balancing function.

On the other hand, if the rotation of the motors 19 and 20 causes equal but opposite movements of rotation of the rings 37 and 51 or in other words causes the rings 43 and 57 to rotate in the same direction by means of the rings 41 and 55, the result thereby achieved is that the pulley 16 which forms a planetwheel and is driven by one of the two rings aforesaid is locked in position about the axis 17 whilst the rings 43 and 57 travel round the gears 42 and 56, thus forming epicyclic gears. This movement accordingly results in pivotal motion of the complete assembly of the arm 2 about the axis 64 from the position of the axis 17.

The control device hereinbefore described essentially provides three main advantages, one of which results from the transmission by a differential system of the movements of the fore-arm about the elbow axis and of rotation of said arm about its own axis. The two other advantages lie in the mode of relative transmission of the movement of elevation of the arm about the shoulder axis and of the movement of the fore-arm about the elbow axis.

The first of these advantages arises in particular from the following considerations: if the motors 18 and 19 are not employed, the motor 20 alone produces a torque which is equally distributed between the movement of the fore-arm 4 about the axis of the elbow pin 3 and the general movement of rotation of the arm 2 about its own axis 64. This equal distribution is achieved as a result of equilibrium of the actions and reactions exerted on the pulley 16 between the gear 59, the gear 47 which is in that case stationary, the tension of the cables 15 on the pulley 16, and the transverse stub shaft 2a, this latter being rigidly fixed to the arm 2 which rotates about its own axis 64.

Figure 4A:
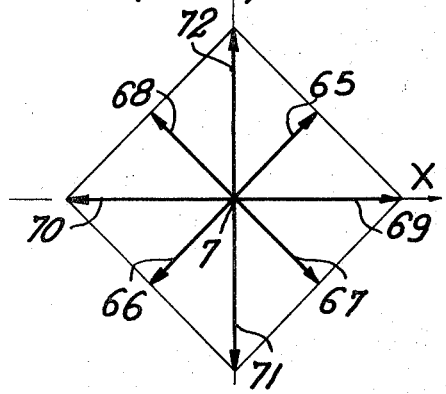
FIGS. 4a and 4b are diagrams of forces applied to the tong unit at the end of the fore-arm under the action of the motors of the drive mechanism.

FIG. 4a accordingly shows in a plane at right angles to the fore-arm which passes through the axis of the pivot-pin 6 of the yoke 5 of the tong unit 7 the mode of distribution of forces arising from the torques which can be applied by the fore-arm 4 when this latter is located at right angles to the arm 2. In this diagram, said forces are plotted as abscissae whilst the forces arising from the movement of rotation of the arm are plotted as ordinates. Under these conditions, the forces 65 and 66 represent the forces corresponding to the maximum torque which can be applied by the motor 20 when operating alone and in each direction.

Similarly, the motor 19 generates the forces 67 and 68; when the two motors 19 and 20 operate simultaneously and assuming that these latter are identical, there can consequently be obtained a force resulting from the movement of the fore-arm such as 69 which is the resultant of the forces 65 and 67. Similarly, the forces 70, 71 and 72 represented in the diagram can be obtained. The envelope of maximum forces generated by the motors 19 and 20 is therefore a square, the vertices of which are the ends of the forces 69, 70, 71 and 72.

Figure 4B:
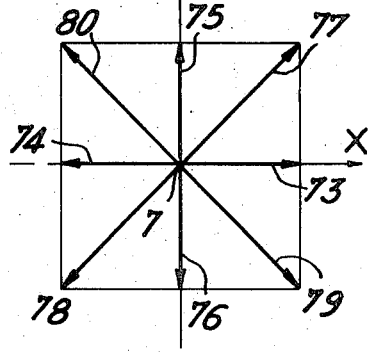

If a comparison is accordingly made between the diagram of FIG. 4a and the diagram of FIG. 4b corresponding to that which would be obtained without a differential drive system by means of independent motors for the forearm elbow movement and the movement of rotation of the arm, it is apparent that said diagrams can be superposed simply as a result of rotation through an angle of 45°.

It is then useful to study the inertia forces produced by the motors 19 and 20 when the tong unit 7 is accelerated in the plane of FIG. 4a in a given direction. An acceleration in the direction of the forces 65 or 66 will first be considered. This concerns only the motor 20 whose inertia as brought back to the level of the wrist corresponds to an apparent mass mo. In the direction of the forces 67 or 68, the apparent mass arising from the motor 19 will still be mo. On the other hand, in the direction of the forces 69 or 70, the inertia arises from both motors 19 and 20. Again considering the same displacement in the direction just mentioned, it is apparent that the angular acceleration of each motor is $\sqrt{2}$ times smaller than in the previous case. Two inertia forces therefore appear in the direction of the forces 65 and 67, the intensity of which is $\sqrt{2}$ times smaller than that of the inertia force in the previous case. On the other hand and as a result of composition, the same inertia force is obtained as in the case in which a single motor is employed. From the foregoing considerations, it accordingly follows that apparent mass does not depend on the direction in which the acceleration takes place, which constitutes a first essential advantage. In fact, from a comparison of the diagrams of FIGS. 4a and 4b which show the most favorable arrangement of the envelope of maximum forces applied by the fore-arm 4 in the case of control by means of a differential drive system, it is apparent that under identical conditions of inertia which result from the motors, the maximum values of the forces correspond to two degrees of freedom of the fore-arm, namely the rotation of this latter about the axis proper of the arm and the bending movement of said fore-arm about its elbow axis, these movements being performed when the two motors 19 and 20 are in cooperating relation.

The two other advantages which result from the arrangements of the invention can be explained by means of the following considerations with reference to FIGS. 5a, 5b, 5c and 5d which are views in elevation showing the manipulator when its fore-arm 4 is located in the vertical plane of the arm 2. The scale is the same for all the figures. C designates the torque exerted by the motor which controls the rotation of the arm about the shoulder axis, that is to say the motor 18. Accordingly, the circle which is centered on the axis of the tong unit represents in the plane of the figure the envelope of the minimum force $f$ which it is desirable to apply in any direction.

Figure 5A:
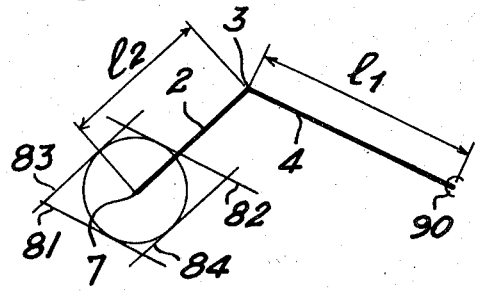
FIGS. 5a, 5b, 5c, 5d are schematic diagrams which illustrate the articulated assembly formed by the arm and the fore-arm of the manipulator and serve to define the values of torque and inertia applied during the different movements of said articulated assembly.

In FIG. 5a, the two straight lines 81 and 82 constitute the envelope of the forces which the tong unit 7 is capable of applying whilst the shoulder torque does not exceed C either in one direction or in the other. If $l_1$ is the length of the arm 2, the following value of shoulder torque will be adopted:

$$C = l_1 \times f.$$

(1)

In consequence, the straight lines 81 and 82 will be tangent to the circle having a radius $f$.

Similarly, if $l_2$ is the length of the fore-arm, the following value of elbow torque will be adopted:

$$c = l_2 \times f.$$

(2)

The straight lines 83 and 84 which represent the envelope of the forces which can be applied by the tong unit whilst the elbow torque does not exceed $c_c$ in each direction are also tangent to the circle having a radius $f$.

Figure 5B:
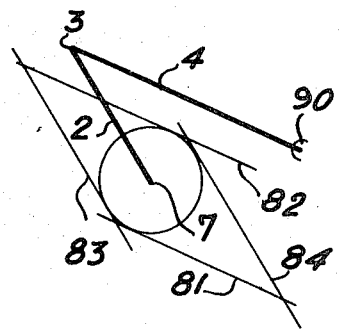

FIG. 5b represents the manipulator in another position in which the angle between the arm 2 and the fore-arm 4 is much smaller. Since the values of torque C and $c$ are always the same, the envelope of maximum forces is still a parallelogram which is circumscribed about the circle having a radius $f$.

Figure 5C:
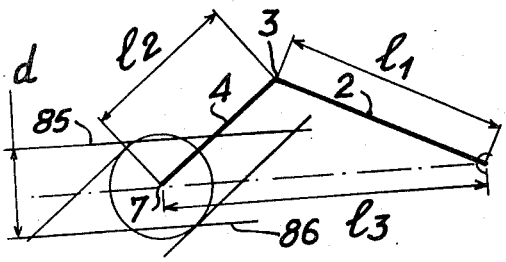
Figure 5D:
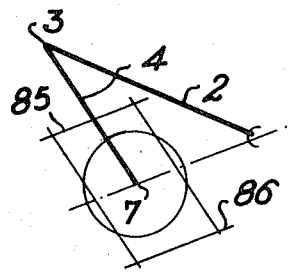

In FIG. 5c, the arrangement of the manipulator is the same as in FIG. 5a and the values of elbow and shoulder torque remain the same as before. In this figure, however, the mechanical transmissions are such that when the motor 19 comes into action alone, the arm 2 and the fore-arm 4 rotate as a complete assembly about the shoulder axis 90 whilst the angle between the arm and the fore-arm remains constant. Similarly, when the motor 20 comes into action alone, it initiates a movement of the fore-arm about the elbow axis whilst the shoulder remains stationary. If $l_3$ is the distance between the shoulder and the tong unit and if the references 85 and 86 represent the straight lines constituting the envelope of the forces which can be applied by the tong unit 7 whilst the torque does not exceed the same value C as before, said straight lines are parallel to the direction in which the tong unit is joined to the shoulder. The distance $d$ between said lines is such that $$d \times l_3 = 2C = 2f \times l_1 \quad (3)$$

or $$d = 2f \times l_1/l_3 \quad (4)$$

In FIG. 5c, the distance $l_3$ is therefore greater than the length of the arm $l_1$: in consequence, the straight lines 85 and 86 intersect the circle having a radius $f$. On the other hand, in the case of FIG. 5d which corresponds to the position of FIG. 5b, said straight lines are located outside the circle. In the first case, the shoulder torque is not sufficient to permit the manipulator to apply the force $f$ in any direction; in the second case, the torque is of excessive value. It is thus apparent that the device according to the invention is such that the torque developed about the shoulder axis is always wholly suited to the minimum force which it is found desirable to apply in all directions.

A third advantage which also arises from the mode of transmission of motion to the arm 2 and the fore-arm 4 is related to the inertia forces arising from the motors which drive these latter. As has already been mentioned, the inertia of the movement of the fore-arm about the elbow axis as a result of the inertia of the two motors which drive said fore-arm by means of the differential system is the same as if said movement were carried out by a single motor. Under these conditions, if an acceleration is imparted to the tong unit 7 in the vertical plane of the arm, two inertia forces consequently appear. One force arises from the motor 18 which produces the shoulder movement and the other force arises from the two motors 19 and 20 which produce the elbow movement, the last-mentioned inertia being equivalent to the inertia which results from a single motor.

Since the forces which can be developed by these two movements are equal and the control means are in any case identical, the inertia in the case of each of these two movements is accordingly the same; in particular, the inertia arising from the motor which produces the shoulder movement is not dependent on the position of the fore-arm with respect to the arm. The total inertia force resulting from the composition of the inertia forces arising from each of the two movements considered is therefore not dependent either on the direction of acceleration in the vertical plane of the arm or on the relative position of the arm and the fore-arm.

It should be noted that, if the motor which initiates the movement about the shoulder axis were to drive the complete arm and fore-arm assembly alone, the inertia arising from said motor would in turn increase when the elbow angle becomes smaller in inverse ratio to the square of the distance $l_3$ which measures the spacing between the shoulder pin and the pivot-pin of the tong unit. In point of fact, this distance varies in practice in a ratio of the order of one to three. It accordingly follows that the inertia which is proportional to the square of this ratio would in turn vary in a ratio of one to nine, which would be prohibitive. On the contrary, when the arm and fore-arm are at right angles, the device according to the invention makes it possible to obtain a perfectly isotropic inertia from the three motors. Moreover, when the angle of the elbow deviates from a right angle, the inertia arising from the movement of rotation of the arm 2 about its own axis 64 increases in inverse ratio to the distance between the tong unit and the pivot-pin of the arm. If the angular displacement of the fore-arm is limited to an angle of ±45° about a line at right angles to the arm, the lateral inertia corresponding to rotation of the arm about its own axis will increase by a factor of two at a maximum without thereby reducing the field of the manipulator to a very appreciable extent.

It is readily apparent that the invention is not limited in any sense to the example of construction which has been more especially described with reference to the accompanying drawings but extends to all alternative forms.

What we claim is:

1. A remote manipulator comprising an arm pivoted about a shoulder axis, a fore-arm pivotally mounted at one end of the arm on an elbow pin which is parallel to the shoulder axis and a tong unit pivotally mounted on a wrist pin provided at that end of the fore-arm which is remote from the elbow pin, the control motions of closure of the tongs, of rotation of the tong unit about its own axis and of elevation of said tong unit about its wrist-pin axis as well as the movement of rotation of the fore-arm about its own axis being performed by means of four independent motors carried by a supporting block pivotally mounted on a pin which is parallel to the elbow pin at the opposite end of the arm, movements having the same amplitudes and the same directions as those of the fore-arm being imparted to said supporting block so as to ensure continuous balancing of the remote manipulator about the shoulder axis and the arm axis proper irrespective of the movements of the arm and of the fore-arm, wherein said remote manipulator is provided for the purpose of carrying out three further movements consisting in the movement of the arm about the shoulder axis, in the movement of rotation of said arm about its own axis and in the movement of the fore-arm about the elbow-pin axis with two motors mounted as a differential drive system so as to ensure that the sum of their actions initiates one of the movements and the difference thereof initiates a second movement whilst a third motor initiates the third movement independently of the two other motors.

2. A remote manipulator according to claim 1, wherein the movement of the arm about the shoulder axis causes the fore-arm to carry out an equal relative movement of rotation through an opposite angle about the elbow-pin axis.

3. A remote manipulator according to claim 1, wherein the movement of the arm about the shoulder axis is carried out by means of a pivotal fork which supports the arm by means of ball-bearings within two bearing housings, said fork which is mounted within a fixed casing being provided with a toothed ring disposed in meshing engagement with a drive pinion driven by the third motor.

4. A remote manipulator according to claim 1, wherein the movements of rotation of the arm about it own axis and of the fore-arm about its elbow-pin axis are carried out by means of two parallel toothed rings driven by the two motors of the differential drive system, one of said rings being rigidly fixed to a cylindrical extension and the other of said rings being rigidly fixed to a shaft in coaxial relation thereto, each of said extension and shaft carrying a further parallel ring provided with a peripheral set of bevel-gear teeth located on a common generating cone having a vertex at the point of intersection of the shoulder axis and of the axis of the arm, said gear-teeth being intended to produce the independent rotation of pinions carried by sleeves surrounding the arm and capable of rotating freely on said arm by means of bearings, said pinions being in turn adapted to drive two further rings provided with peripheral sets of bevel-gear teeth and carried by a pulley rotatably mounted on a stub shaft rigidly fixed to the arm and having an axis in coincident relation with the shoulder axis, said pulley being provided with grooves for guiding and transferring an element for the transmission of the movement of rotation thereof to a pulley having the same diameter which is secured to the fore-arm and the axis of which coincides with the elbow-pin axis.

* * * * *